June 17, 1969
B. B. DUNNE
3,451,008
SHOCK WAVE OPTICALLY PUMPED LASER
Filed July 22, 1964
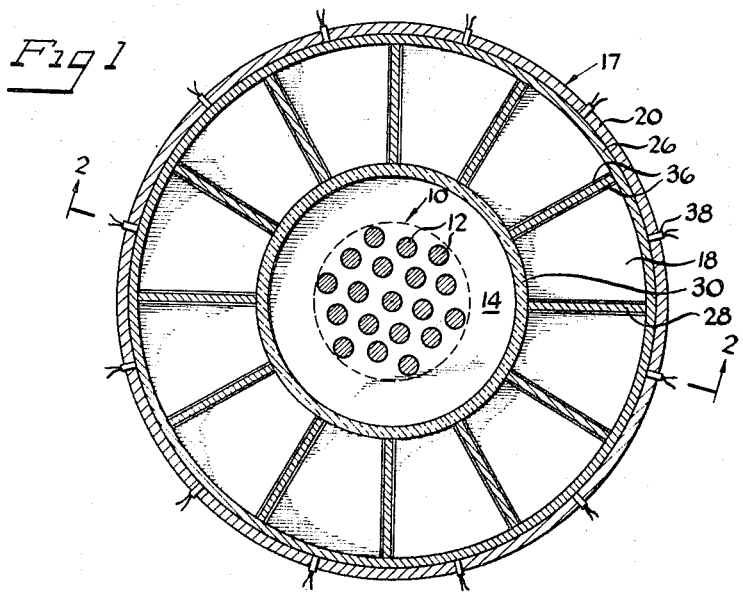
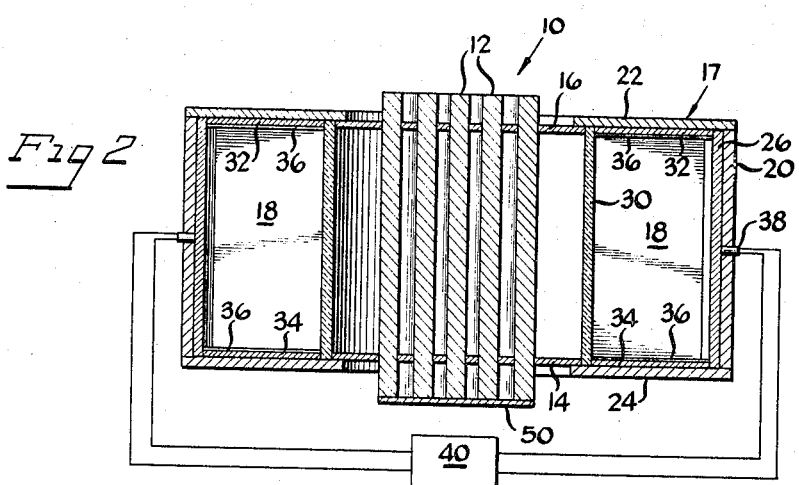
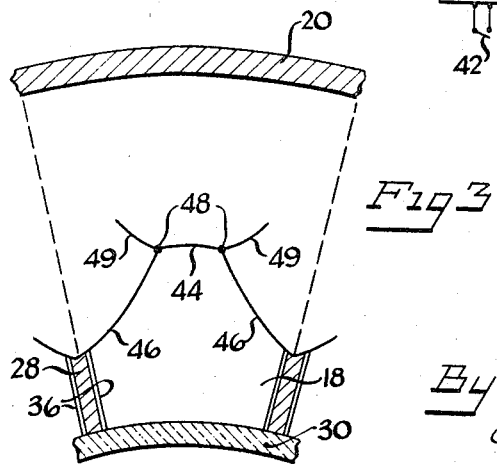
Inventor
Brian B. Dunne
By Anderson, Luedeka, Fitch, Even & Tabin
Atty's

United States Patent Office 3,451,008
Patented June 17, 1969

3,451,008
SHOCK WAVE OPTICALLY PUMPED LASER
Brian B. Dunne, San Diego, Calif., assignor, by mesne assignments, to Gulf General Atomic Incorporated, San Diego, Calif., a corporation of Delaware
Filed July 22, 1964, Ser. No. 384,501
Int. Cl. H01s 3/02, 3/09, 3/22
U.S. Cl. 331—94.5                         13 Claims The present invention relates to the optical pumping of lasers and more particularly to an explosively energized light source for such optical pumping.

Although a recent development, the laser has been widely publicized and requires no detailed explanation. The name laser is an acronym for light amplification by stimulated emission of radiation. It has been found that certain materials, notably ruby and certain plastics and neodymium-doped glasses, exhibit the property of emitting coherent light when appropriately supplied with energy and triggered or stimulated. These laser materials may be supplied with energy either electrically or optically, such energy being used to change the energy level of the electrons in the material. This action is known as pumping the laser. After sufficient pumping, the laser may be caused to emit this energy as coherent light, that is, light emitted in phase in a single direction. The emission of coherent light may occur spontaneously, a phenomenon known as self-lasing.

The present invention is directed to the pumping of the laser and, in particular, to optical pumping where light is generated in a noble gas by shock waves produced by high explosives. It is well known that noble gases, in particular, argon, krypton and xenon emit light when shocked by high explosive. Such light sources have been used to produce very short high intensity light flashes. In accordance with the present invention, such explosively produced light flashes are utilized for pumping a laser. In particular, in accordance with the present invention, high explosive is disposed circumferentially around laser material with high explosive material extending radially inwardly from the encircling high explosive material toward the laser material. Noble gas is disposed between the high explosive and the laser. Detonation of the explosive produces a shock wave which heats the noble gas to incandescence. The high intensity light thus produced is thereupon transmitted to the laser and pumps the laser to a sufficient energy level that coherent light is emitted. The laser and the explosive material may be of such size that a very large amount of energy may be pumped into and emitted from the laser upon the laser action, for example, upwards of a megajoule. Such high intensity release of energy has many applications such as in the military, for this energy may be transmitted as coherent light to a very distant point because of the inherent sharp focusing of lasers.

Therefore, the primary object of the present invention is to provide a high intensity light source, explosively energized, and used for laser pumping. More particularly, it is an object of the invention to provide a circular array of explosive about a laser which operates to heat contained noble gas to incandescence to provide light for exciting a laser. It is still a further object of the invention to provide such a light source that can be utilized to excite a very large laser to provide a very large amount of light energy in a very narrow beam at great distances.

Various other objects and advantages of the present invention will become apparent from the following detailed description considered in conjunction with the accompanying drawings in which:

FIGURE 1 is a cross-sectional view of one form of the optically pumped laser apparatus of the present invention;

FIGURE 2 is a side view of the apparatus of FIGURE 1 partly in cross section along line 2—2; and FIGURE 3 shows the formation of a Mach reflection by the apparatus shown in FIGURES 1 and 2.

A preferred form of the invention is as shown in FIGURES 1 and 2. Laser 10 may be, as shown, a plurality of rods 12 made of laser material supported in parallel relationship by grids 14 and 16. Completely surrounding the laser material is a containment vessel 17 comprised of a plurality of chambers 18 containing one or more noble gases preferably argon, krypton or xenon. These chambers are formed partly by a surrounding cylindrical wall 20 and end walls 22 and 24. The inside of the wall 20 is lined with explosive 26. Between the chambers and defining the chamber walls are explosive sheets 28 extending radially from the wall 20 toward the laser rod or rod assembly 10. These sheets are substantially equidistantly spaced around the periphery of the wall 20 to make the chambers all substantially alike. These sheets may be self-supporting or disposed on opposite sides of a supporting member. The chambers are then closed by cylindrical inner wall 30 which acts as a window transmissive of light emitted by the gas in the chambers 18. Explosive end sheets 32 and 34 are disposed in the chambers on the end walls 22 and 24, respectively. The end sheets 32 and 34 and the radial sheets 28 are preferably coated with reflective material, such as aluminized Mylar, on the gas side of the sheets, as shown at 36. Detonators 38 are placed centrally on the various sections of the explosive 26 and electrically connected to an energy source 40 controlled by switch 42.

Closing switch 42 simultaneously energizes the detonators 38 thereby causing the high explosive 26 to explode beginning at the section centers. The encircling explosive 26 may be relatively thick and made of a high explosive material such as Composition B. The explosion is partly confined by the outer wall 20 and produces an inwardly-traveling strong shock wave. When the explosions reach the ends of the sections, they detonate the sheets 28, 32 and 34. Typical explosive materials for these sheets are composition C-3, composition C-4, plastic-bonded HMX and plastic-bonded PETN, although the encircling explosive and sheets may be of the same explosive material. The detonation travels down the sheets toward the laser, producing additional shock waves. These shock waves may travel as shown in FIGURE 3. The shock wave 44 travels radially inward from the high explosive 26. The shock waves 46 from the sheets 28 move generally away from the sheets 28. Each of these shock waves 44 and 46 may be sufficient to heat the noble gases in the chambers 18 to incandescence. However, the radial explosive serves to augment the primary shock wave from the explosive 26 by the phenomenon of Mach reflection. The shock wave generated by the detonation of the explosive 26 would rapidly decelerate as its energy was dissipated in the gas except for the fact that the explosion continues down the radial and end explosive sheets. This additional explosive continues to add energy to the principal shock wave as the explosion travels inwardly, thus prolonging and reinforcing the shock. The angle between successive radial sheets, the energy released per unit mass of the sheets and the rate of travel of the detonation down the sheets shown in FIGURE 3 is such that Mach reflection occurs. Thus, the inwardly traveling shock wave 44 starts out as a primary shock wave produced by the explosive 26, is reinforced by the shock waves 46, and later becomes primarily a bridge wave or Mach stem as the energy from the explosive 26 is dissipated. The lines 48 (which appear as points in the view shown in FIGURE 3) join this bridge wave 44 with each of the oncoming shock waves 46, and reflected shock waves 49. The Mach reflection creates a greater heating of the gas and hence greater light emission in a short time while keeping the needed amount of explosive to a minimum. The gas may thus be heated to a temperature of the order of 30,000° C., which produces a high degree of incandescence as opposed to the relatively low incandescence produced by the lower temperatures of the order of 5,000° C.

The radial length of the sheets determines how long the shock lasts and is made sufficient to permit time for the pumping of the laser. The light emitted by the gas in the chambers 18 is reflected from the walls of the chambers and transmitted through the window 30 to the laser 10. The window 30 is made of material transmissive of light from the noble gas of the wave length suitable for exciting or pumping the laser. The laser material must be capable of being pumped by the light of the frequencies reaching it from the noble gas, i.e., emitted by the gas and transmitted by the window. The window 30 may be laminated plastic and glass. The material must not produce light quenching. It is preferably relatively non-transmissive of energy in the parts of the spectrum substantially incapable of exciting the laser in order that the laser material not be uselessly heated. Still further the window 30 is shock resistant. It must protect the laser from the shock of the high explosive at least until laser action has occurred. In some instances, it may be made strong enough to withstand the shock so as to preserve the laser material. However, in some applications, it is permissible to permit the shock to destroy the laser material so long as the laser action has already occurred.

As noted above, the laser material is preferably in the form of rods. This permits the light to reach a greater mass of laser material without its being diffused through the laser material. The light may be transmitted into the inner laser rods by multiple reflections from surfaces of the various laser rods, allowing sufficient pumping light to reach the central region. Further, it is contemplated that a relatively large volume of laser material be used and the smaller rods are more readily fabricated. The laser 10 may be as large as one meter in diameter and two meters long. The containment vessel may be about four meters in diameter.

The rods 12 may be disposed, as shown, substantially uniformly spaced in an array, or they may be disposed in a circle so that each rod is exposed to the same environment and pumped to the same extent. Alternatively the laser 10 may be a single rod.

As the shock waves proceed inwardly, the rods are pumped until laser action occurs. Although the lasers may be used to emit light from both ends, preferably a mirror 50 or a totally reflecting prism, such as a roof prism, is disposed on one end so that all of the light is emitted in the same direction from the other end.

Although certain specific embodiments have been described herein, further modifications may be made hereto without departing from the true spirit and scope of the invention as set forth in the appended claims.

What is claimed is:

1. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, and means for detonating said high explosive material to produce a plurality of shock waves which interact with one another to produce Mach reflections sufficient to heat said noble gas to incandescence, and said inner wall being transmissive of light from said noble gas to said laser.

2. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending inwardly from said encircling high explosive material, and means for detonating said encircling high explosive material at a plurality of points around its periphery substantially midway between said sheets, said high explosive material being sufficient upon detonation to heat said noble gas to incandescence for a period of time dependent upon the length of said sheets, and said inner wall being transmissive of light from said noble gas to said aser.

3. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending radially inwardly from said encircling high explosive material at substantially equidistance circumferentially spaced points, and means for detonating said encircling high explosive material substantially simultaneously at a plurality of points around its periphery substantially midway between said radial sheets, said high explosive material being sufficient upon detonation to heat said noble gas to incandescence for a period of time dependent upon the length of said radial sheets, and said inner wall being transmissive of light from said noble gas to said laser.

4. Apparatus for optically pumping a laser comprising an annular containment vessel for substantially surrounding said alser, said containment vessel having an outer wall and an inner wall, high explosive material disposed on said inner surface for substantially encircling said laser, noble gas disposed within said containment vessel, a plurality of sheets made of high explosive material extending radially inwardly from said encircling high explosive material at substantially equidistant circumferentially spaced points, said members being coated with light reflective material, and means for detonating said encircling high explosive material substantially simultaneously at a plurality of points around its periphery substantially midway between said radial sheets, said high explosive being sufficient upon detonation to heat said noble gas to incandescence for a period of time dependent upon the length of said radial members, and said inner wall being transmissive of light from said noble gas to said laser.

5. Apparatus for optically pumping a laser comprising an annular containment vesesl for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending inwardly from said encircling high explosive material, and means for detonating said encircling high explosive material at a plurality of points around its periphery substantially midway between said sheets, thus producing primary shock waves by the explosion of said encircling material and secondary shock waves by the explosion of said sheets, the high explosive material of said sheets producing interaction of said primary and secondary shock waves to produce Mach reflections sufficient to heat said noble gas to incandescence, and said inner wall being transmissive of light from said noble gas to said laser.

6. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending inwardly from said encircling high explosive material, and means for detonating said encircling high explosive material at a plurality of points around its periphery substantially midway between said sheets, thus producing primary shock waves by the explosion of said encircling material and secondary shock waves by the explosion of said sheets, the angle between successive sheets, the energy released per unit mass of said sheets, and the rate of detonation of said high explosive material of said sheets producing interaction of said primary and secondary shock waves to produce Mach reflections to heat said noble gas to a high degree of incandescence, and said inner wall being transmissive of light from said noble gas to said laser.

7. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending radially inwardly from said encircling high explosive material at substantially equidistant circumferentially spaced points, and means for detonating said encircling high explosive material substantially simultaneously at a plurality of points around its periphery substantially midway between said radial sheets, thus producing primary shock waves by the explosion of said encircling material and secondary shock waves by the explosion of said radial sheets, the high explosive material of said radial sheets producing interaction of said primary and secondary shock waves to produce Mach reflections sufficient to heat said noble gas to incandescence for a period of time dependent upon the length of said radial sheets, and said inner wall being transmissive of light from said noble gas to said laser.

8. Apparatus for optically pumping a laser comprising an annular containment vessel for substantially surrounding said laser, said containment vessel having an outer wall and an inner wall, high explosive material disposed on the inside of and adjacent said outer wall for substantially encircling said laser, noble gas disposed within said containment vessel, a plurality of sheets made of high explosive material extending radially inwardly from said encircling high explosive material at substantially equidistant circumferentially spaced points, and means for detonating said encircling high explosive material substantially simultaneously at a plurality of points around its periphery substantially midway between said radial sheets, thus producing primary shock waves by the explosion of said encircling material and secondary shock waves by the explosion of said radial sheets, the angle between successive radial sheets, the energy released per unit mass of said sheets, and the rate of detonation of said high explosive material of said radial sheets producing interaction of said primary and secondary shock waves to produce Mach reflections to heat said noble gas to a high degree of incandescence for a period of time dependent upon the length of said radial sheets, and said inner wall being transmissive of light from said noble gas to said laser.

9. An optically pumped laser system comprising a laser, an annular containment vessel substantially surrounding said laser, said containment vessel having an outer wall and an inner wall, high explosive material disposed on the inside of and adjacent said outer wall, noble gas disposed within said containment vessel, a plurality of sheets made of high explosive material extending radially inwardly from said encircling high explosive material at substantially equidistant circumferentially spaced points, and means for detonating said encircling high explosive material substantially simultaneously at a plurality of points around its periphery substantially midway between said radial sheets, thus producing primary shock waves by the explosion of said encircling material and secondary shock waves by the explosion of said radial sheets, the high explosive material of said radial sheets producing interaction of said primary and secondary shock waves to produce Mach reflections sufficient to heat said noble gas to incandescence for a period of time dependent upon the length of said radial sheets, said inner wall being transmissive of light from said noble gas to said laser, and said laser being formed of material optically pumped by light of the frequencies emitted by said noble gas and transmitted by said inner wall.

10. An optically pumped laser system comprising a laser, an annular containment vessel substantially surrounding said laser, said containment vessel having an outer wall and an inner wall, high explosive material disposed on the inside of and adjacent said outer wall, noble gas disposed within said containment vessel, a plurality of sheets made of high explosive material extending radially inwardly from said encircling high explosive material at substantially equidistant circumferentially spaced points, and means for detonating said encircling high explosive material substantially simultaneously at a plurality of points around its periphery substantially midway between said radial sheets, thus producing primary shock waves by the explosion of said encircling material and secondary shock waves by the explosion of said radial sheets, the angle between successive radial sheets, the energy released per unit mass of said sheets, and the rate of detonation of said high explosive material of said radial sheets producing interaction of said primary and secondary shock waves to produce Mach reflections to heat said noble gas to a high degree of incandescence for a period of time dependent upon the length of said radial sheets, said inner wall being transmissive of light from said noble gas to said laser, and said laser being formed of material optically pumped by light of the frequencies emitted by said noble gas and transmitted by said inner wall.

11. An optically pumped laser system comprising a laser, an annular containment vessel substantially surrounding said laser, said containment vessel having an outer wall and an inner wall, high explosive material disposed on the inside of and adjacent said outer wall, noble gas disposed within said containment vessel, a plurality of sheets made of high explosive material extending radially inwardly from said encircling high explosive material at substantially equidistant circumferentially spaced points, and means for detonating said encircling high explosive material substantially simultaneously at a plurality of points around its periphery substantially midway between said radial sheets, thus producing primary shock waves by the explosion of said encirculating material and secondary shock waves by the explosion of said radial sheets, the high explosive material of said radial sheets producing interaction of said primary and secondary shock waves to produce Mach reflections sufficient to heat said noble gas to incandescence for a period of time dependent upon the length of said radial sheets, said inner wall being transmissive of light from said noble gas to said laser and mechanically resistant to the explosive shock of said explosions at least until laser action occurs, and said laser being formed of material optically pumped by light of the frequencies emitted by said noble gas and transmitted by said inner wall.

12. An optically pumped laser system comprising a laser, a containment vessel, noble gas disposed within said vessel, said vessel having a portion thereof optically positioned between said gas and said laser and transmissive of light emitted by said noble gas, first high explosive material disposed within said vessel and spaced from said portion, second high explosive material disposed in sheet form within said vessel and extending at an angle to said first high explosive material from said first high explosive material toward said portion, and means for detonating said first high explosive material to produce a first shock wave in said noble gas, the detonation of said first high explosive material producing detonation of said second high explosive material to produce a second shock wave, said angle and the rate of travel of the detonation of said second high explosive material producing interaction between said first and second shock waves to produce a Mach reflection in said noble gas to heat said noble gas to a high degree of incandescence, said laser being formed of material optically pumped by light of the frequencies emitted by said noble gas and transmitted by said portion.

13. An optically pumped laser system comprising a laser, a containment vessel, noble gas disposed within said vessel, said vessel having a portion thereof optically positioned between said gas and said laser and transmissive of light emitted by said noble gas, first high explosive material diposed within said vessel and spaced from said portion, second high explosive material disposed in sheet form within said vessel and extending at an angle to said first high explosive material from said first high explosive material toward said portion, and means for detonating said first high explosive material to produce a first shock wave in said noble gas, the detonation of said first high explosive material producing detonation of said second high explosive material to produce a second shock wave, said angle and the rate of travel of the detonation of said second high explosive material producing interaction between said first and second shock waves to produce a Mach reflection in siad noble gas to heat said noble gas to a high degree of incandescence for a period of time dependent upon the length of said second high explosive material in the direction of said portion, said laser being formed of material optically pumped by light of the frequencies emitted by said noble gas and transmitted by said portion.

References Cited

UNITED STATES PATENTS

| 3,224,236 | 12/1965 | De Ment | 336—94.5 |
| 3,235,816 | 2/1966 | Wanlass | 331—94.5 |
| 3,271,696 | 9/1966 | De Ment | 331—94.5 |
| 3,271,980 | 9/1966 | Boyd | 331—94.5 |

JEWELL H. PEDERSEN, *Primary Examiner.*

RONALD L. WIBERT, *Assistant Examiner.*